(12) United States Patent
Chun et al.

(10) Patent No.: US 6,845,138 B2
(45) Date of Patent: Jan. 18, 2005

(54) SPACER GRID WITH HYBRID FLOW-MIXING DEVICE FOR NUCLEAR FUEL ASSEMBLY

(75) Inventors: Taehyun Chun, Daejeon-si (KR); Dongseok Oh, Daejeon-si (KR); Wangkee In, Daejeon-si (KR); Keenam Song, Daejeon-si (KR); Hyungkyu Kim, Daejeon-si (KR); Heungseok Kang, Daejeon-si (KR); Kyungho Yoon, Daejeon-si (KR); Younho Jung, Daejeon-si (KR)

(73) Assignees: Korea Atomic Energy Research Institute, Daejeon-si (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 10/215,997

(22) Filed: Aug. 7, 2002

(65) Prior Publication Data

US 2003/0053584 A1 Mar. 20, 2003

(30) Foreign Application Priority Data

Aug. 10, 2001 (KR) ........................................ 2001-48173

(51) Int. Cl.[7] ................................................. G21C 3/34
(52) U.S. Cl. ...................... 376/439; 376/462; 376/443; 376/447; 376/454
(58) Field of Search ............................... 376/437–443, 376/447, 454, 462

(56) References Cited

U.S. PATENT DOCUMENTS

| 3,663,367 | A | * | 5/1972 | Calvin | 376/439 |
|---|---|---|---|---|---|
| 4,089,741 | A | * | 5/1978 | Patterson et al. | 376/439 |
| 4,692,302 | A | | 9/1987 | DeMario et al. | 376/439 |
| 5,283,821 | A | * | 2/1994 | Karoutas | 376/439 |
| 5,299,245 | A | | 3/1994 | Aldrich et al. | 376/439 |
| 5,307,393 | A | * | 4/1994 | Hatfield | 376/442 |
| 5,327,472 | A | * | 7/1994 | Kraemer et al. | 376/439 |
| 5,440,599 | A | | 8/1995 | Rodack et al. | 376/439 |
| 6,236,702 | B1 | | 5/2001 | Chun et al. | 376/462 |
| 6,278,758 | B1 | * | 8/2001 | Imaizumi et al. | 376/438 |

FOREIGN PATENT DOCUMENTS

JP         2000-028772     *  1/2000  ................. 376/439

* cited by examiner

Primary Examiner—Jack Keith
(74) Attorney, Agent, or Firm—Bachman & LaPointe, P.C.

(57) ABSTRACT

A spacer grid with hybrid flow-mixing devices for nuclear fuel bundle is made up of an intersection of a plurality of thin straps at right angles to form a plurality of cells for receiving and supporting fuel rods. Each strap is composed of two types of strap units, called a primary strap unit and a secondary strap unit, which are alternately arranged along the strap. The primary strap unit is a strap section having a primary vane set, and a secondary strap unit is a strap section having a secondary vane set. The straps intersect such that, by primary and secondary strap units, each intersection forms a hybrid flow-mixing device around the top of each junction. The primary vane set, consisting of a trapezoidal primary vane stand and two bent primary mixing vanes on both sides, protrudes upwardly from the strap and is primarily for generating cross flow between channels. Meanwhile, the secondary vane set, consisting of a trapezoidal secondary vane stand and two bent primary mixing vanes on both sides, also protrudes upwardly from the strap, but is primarily for swirl flow generation within the channels. The hybrid flow-mixing device induces a complex but effective flow pattern in flow channels for fuel rod cooling.

9 Claims, 7 Drawing Sheets

-- Fig. 1 --
CONTEMPORARY ART
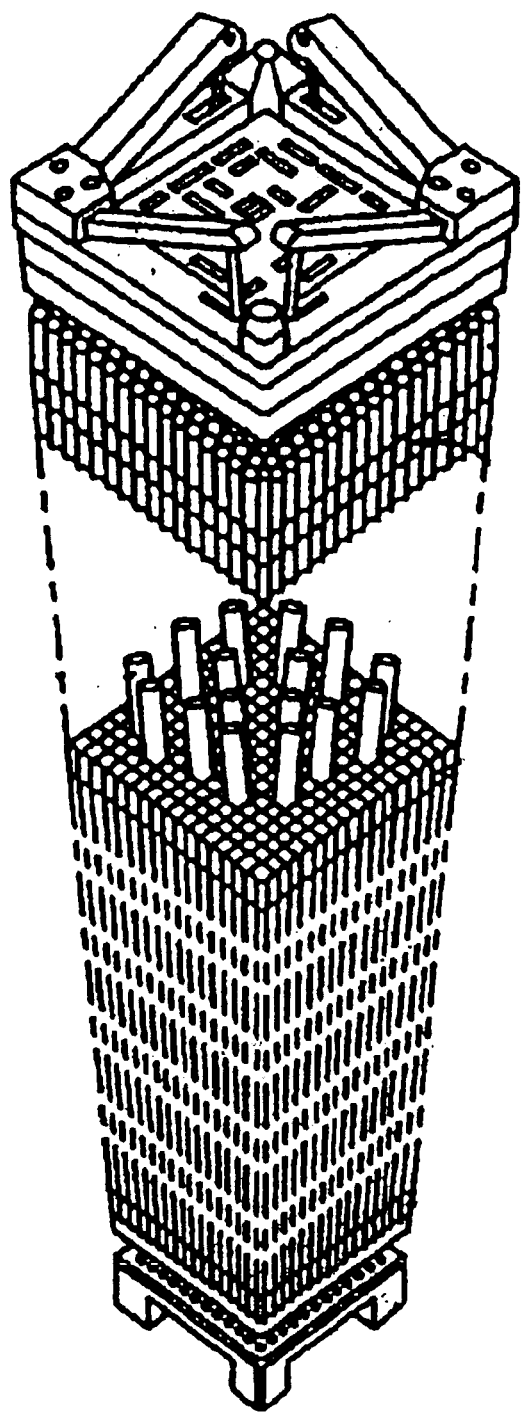

--Fig. 2--
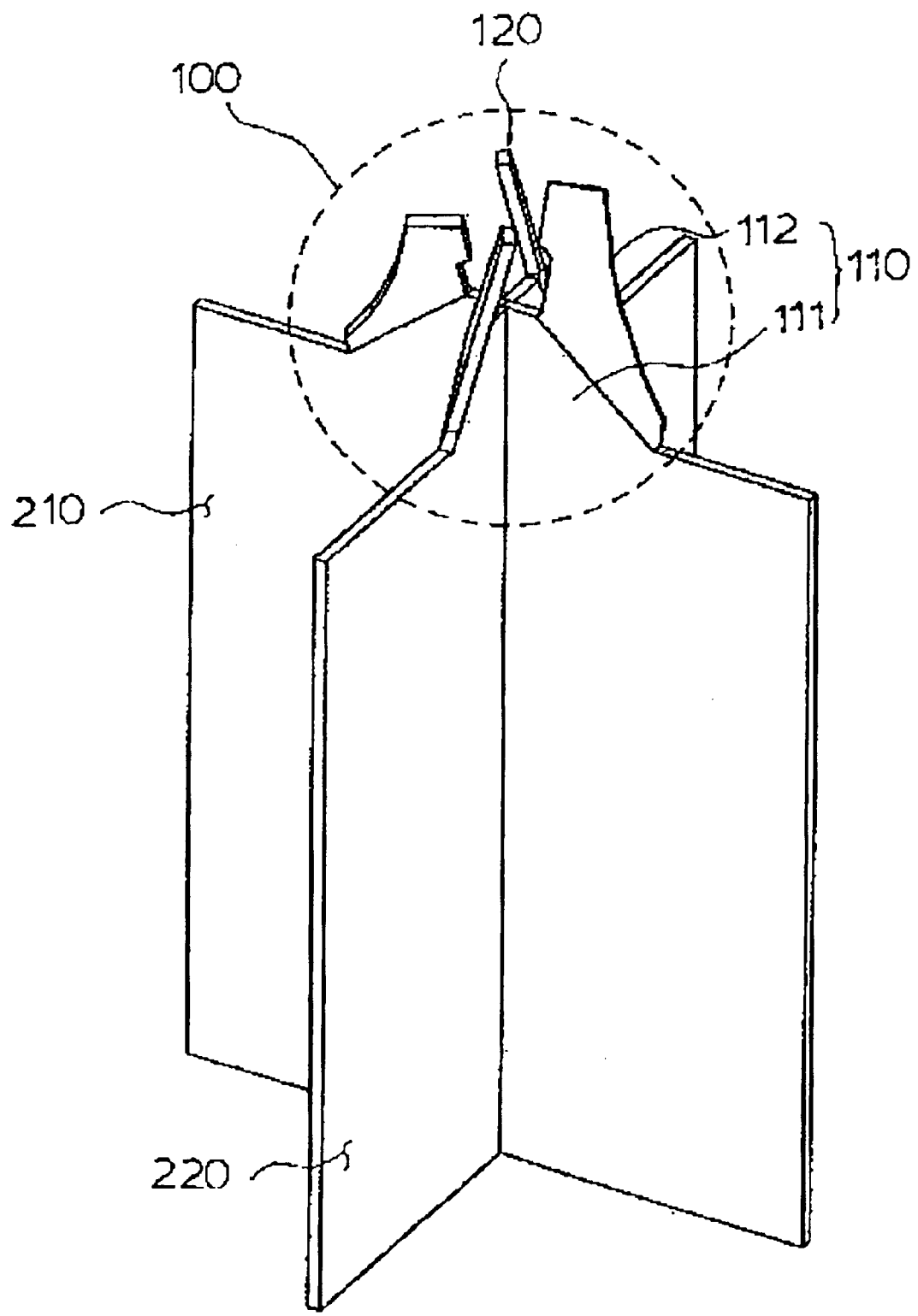

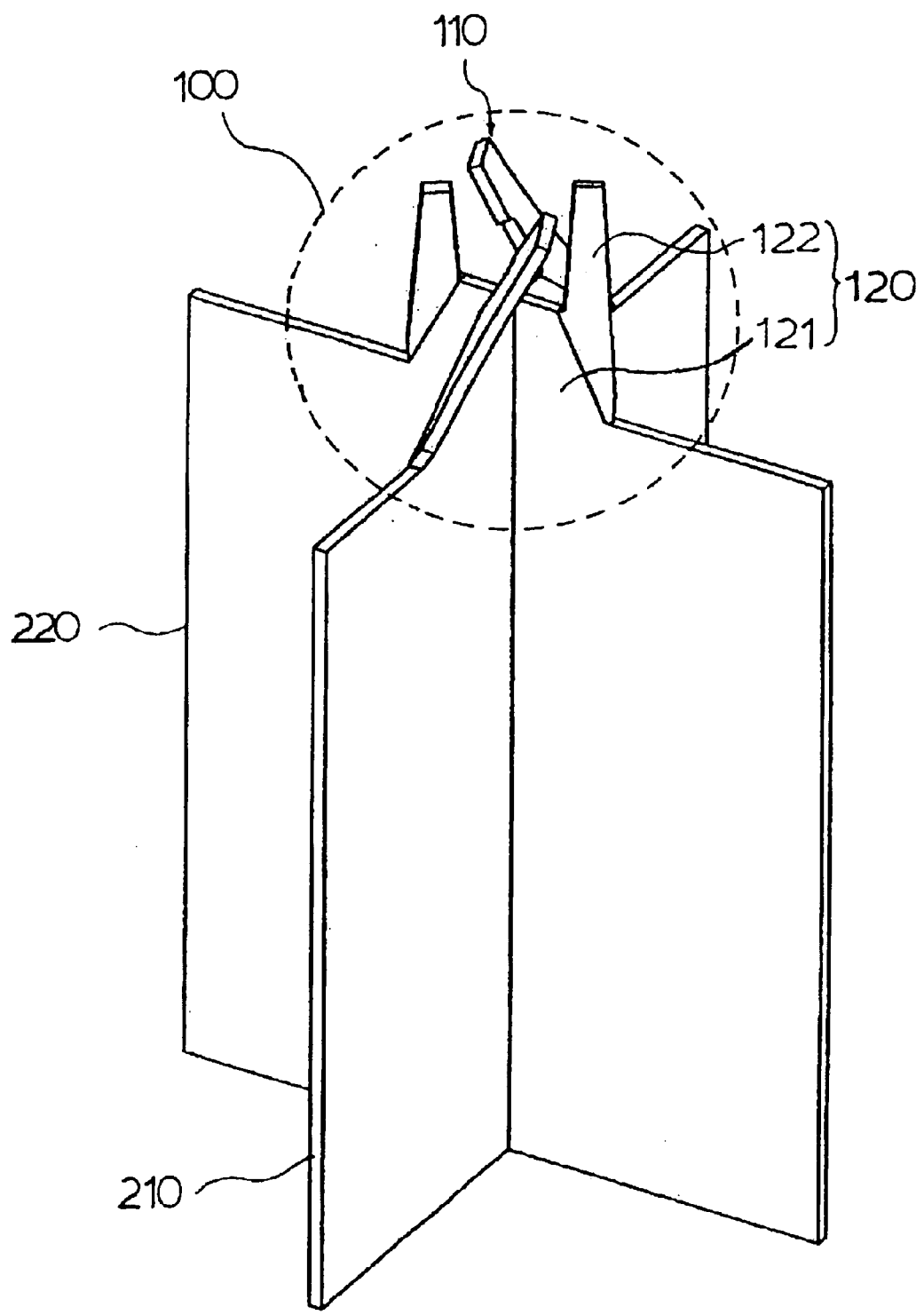
--Fig. 3--

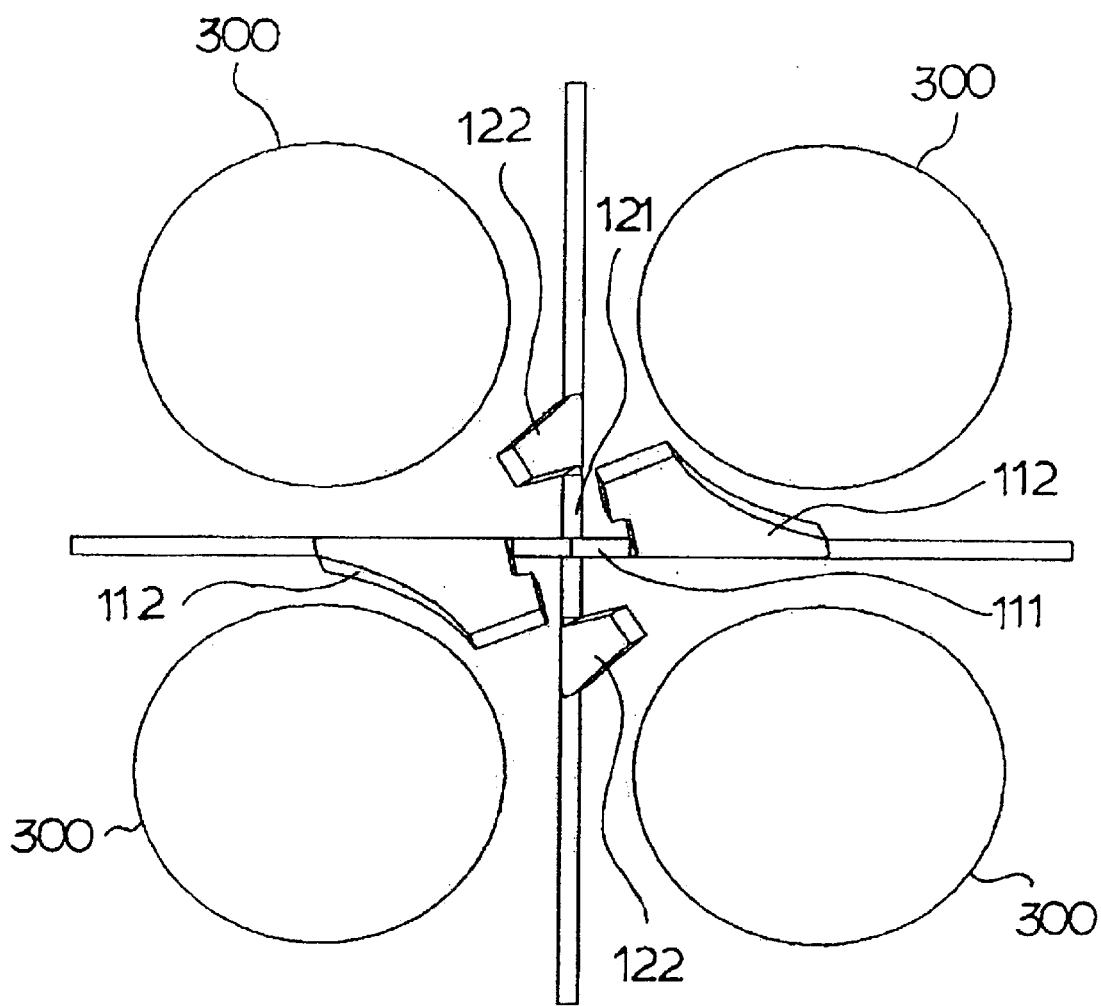
--Fig. 4--

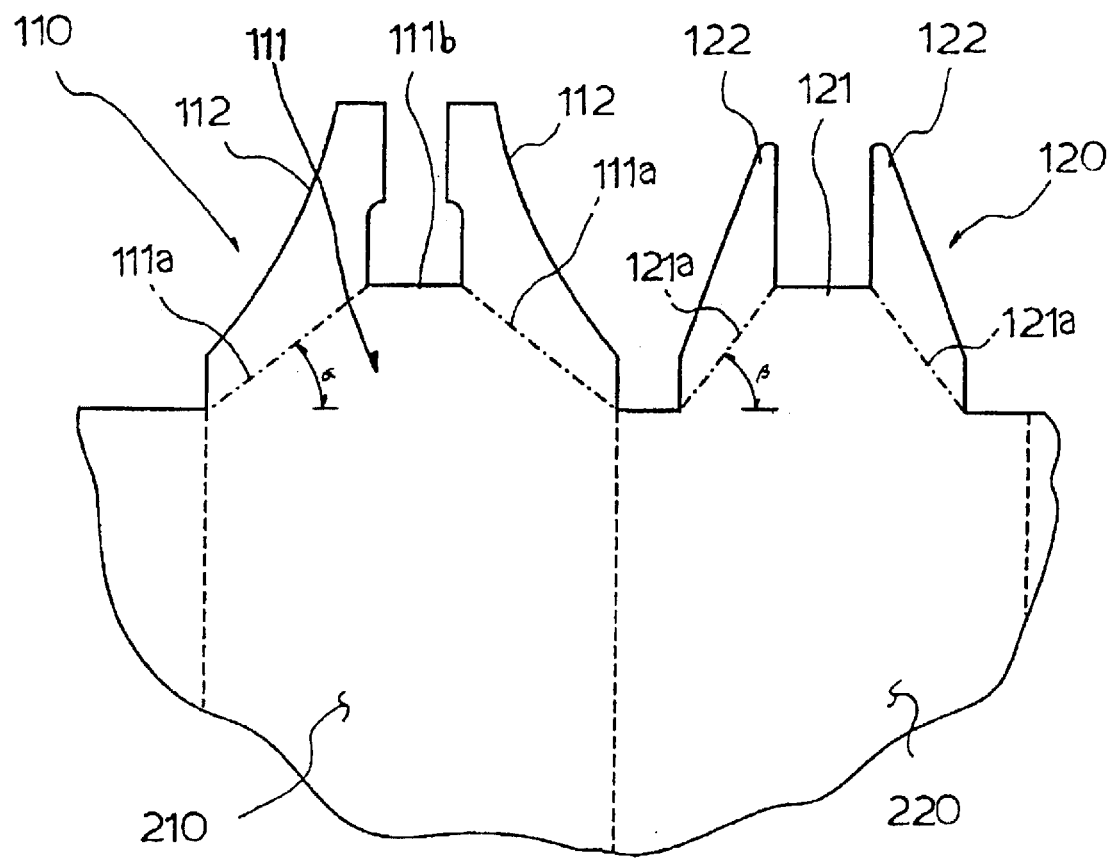
--Fig. 5--

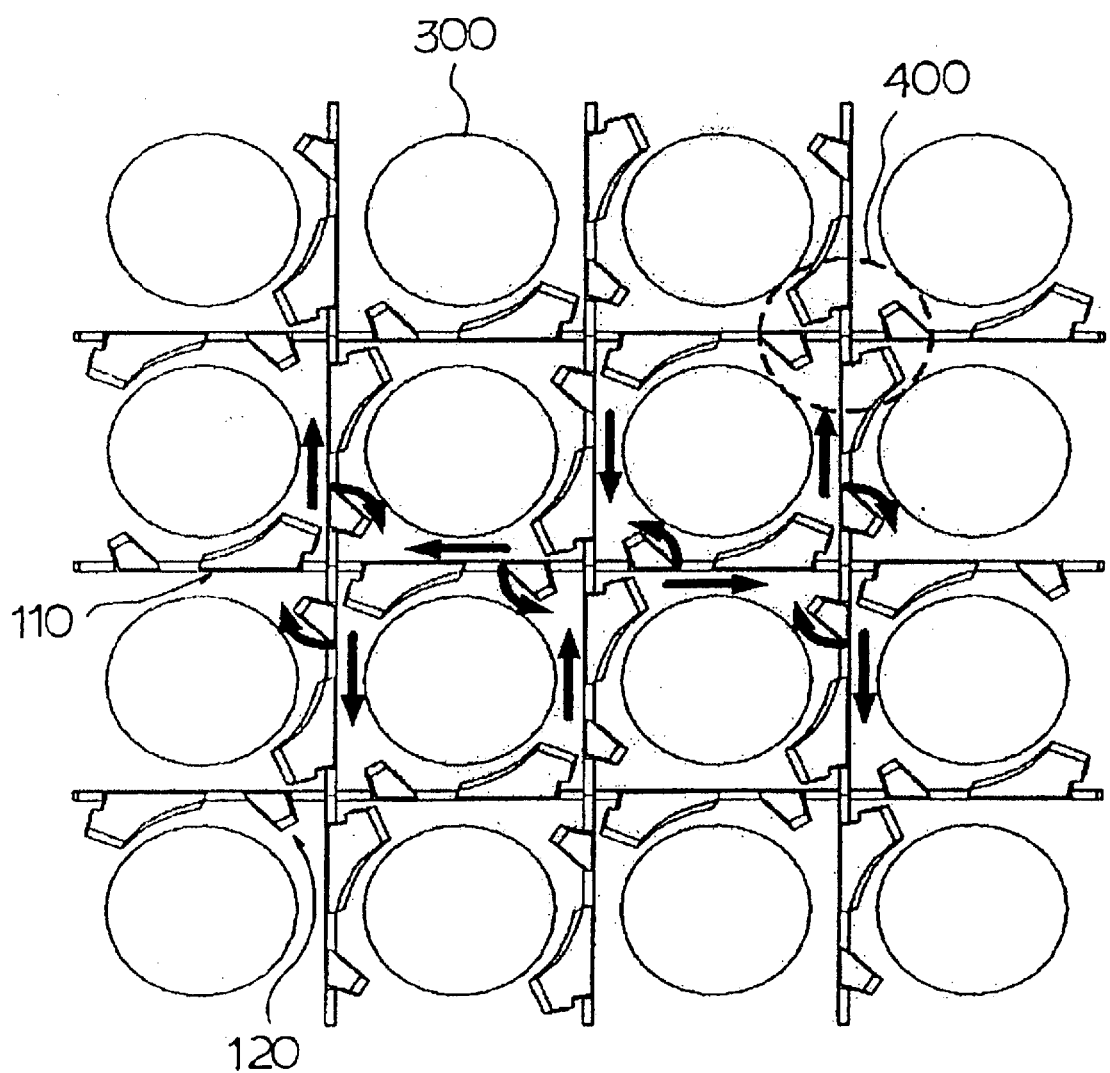
--Fig. 6--

--Fig. 7--
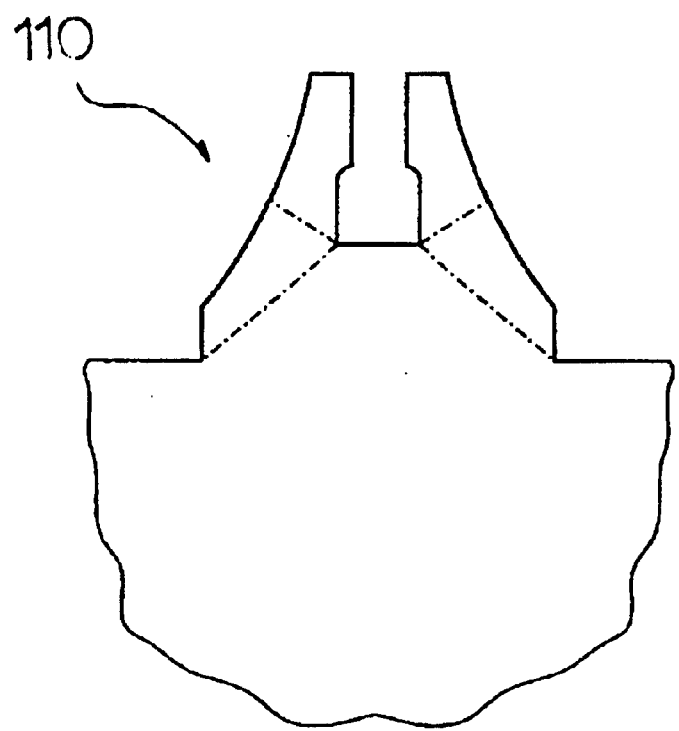
--Fig. 8--
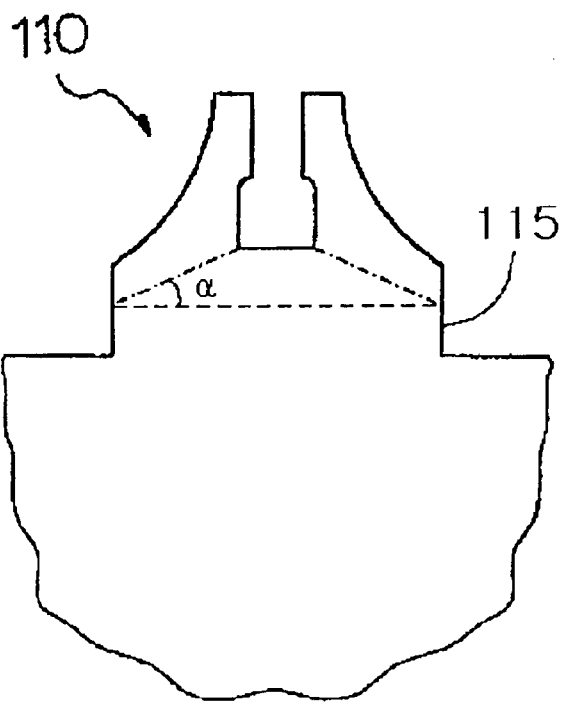

SPACER GRID WITH HYBRID FLOW-MIXING DEVICE FOR NUCLEAR FUEL ASSEMBLY

BACKGROUND OF THE INVENTION

1. Field of the Invention

The present invention relates, in general, to spacer grids used for supporting a plurality of fuel rods in a nuclear fuel assembly and, more particularly, to a spacer grid provided with a hybrid flow-mixing vane at the top of each intersection of inner straps, thus improving the efficiency of heat removal from nuclear fuel rods through flow mixing in coolant channels.

2. Discussion of the Related Art

As shown in FIG. 1, a contemporary fuel assembly for nuclear reactors has a square cross-section and includes a plurality of fuel rods. The fuel rods are regularly arranged by several spacer grids positioned along the axial direction.

The spacer grids for the above nuclear fuel assembly are normally fabricated by intersecting at right angles a plurality of thin straps, each having a height of about 4 cm, at their vertical slits to form a plurality of four-walled cells for receiving the fuel rods. In each strap of the spacer grid, the vertical slits are formed from the upper or lower edge of the strap and are regularly spaced at an interval equal to a desired pitch of the fuel rods. Each strap of a spacer grid is made of a metal strap and is divided into a plurality of unit straps on the basis of vertical slits. Grid springs and dimples are formed at each strap and are used for supporting a corresponding fuel rods.

The primary function of the spacer grid is to support a plurality of fuel rods in a nuclear fuel assembly while maintaining a constant gap clearance among fuel rods so as to form a plurality of coolant paths. Normally, a confined volume enclosed by four fuel rods is defined as a flow channel. The channels are connected to each other through rod gaps so that the coolant can pass freely between channels. Upon reactor operation, the fuel rods generate tremendous energy by the nuclear reaction, and the coolant flowing through the channels among the fuel rods is to remove the energy.

Typically, the fuel rods emit different thermal outputs due to a non-uniform neutron flux distribution in the reactor core, and accordingly, the coolant temperatures in the channels are also non-uniformly distributed. Under these conditions, if operational transients or unexpected conditions occur, such as a pump unexpectedly stopping to reduce the coolant flow in the reactor core or a power control rod being ejected from the core to exceed the nominal thermal outputs of other fuel rods around it, a thermal critical condition (called "dryout") may occur on the surface of the hottest fuel rod cladding.

Dryout is a sudden increase in wall temperature, approaching a melting point, which results from a paralysis of heat transfer due to the generated vapor bubbles covering the heated surface and blocking of coolant supply adjacent to the surface. In such a case, the local overheating area in the fuel rod cladding is fused, allowing the radioactive materials restrained inside to leak into the core and consequently contaminating the nuclear reactor.

To minimize the risk of such incidents in the reactor and to attain a sufficient operational margin, an additional role of the spacer grid, one of flow mixing in the fuel assembly, has recently been emphasized. Flow mixing breaks down the thermal boundary layers formed around the fuel-cladding surface, to relieve the sharp temperature gradient near the heated surface. Flow mixing also reduces the imbalance of coolant temperatures among neighboring channels. These effects can assist in lower the temperature of the hottest channel and thus easily avoid a critical condition.

The spacer grid with a flow-mixing device produces a complex flow pattern when the coolant passes through the device. The flow pattern can be characterized, based on the flow-mixing pattern, as one of three types. First, violent eddies and turbulence are generated just downstream from the spacer grid, which are always present where the fluid flow encounters a blunt obstacle, but the pattern decays very quickly. Second, lateral or cross flow occurs due to a flow deflection toward neighboring channels, and is also limited to within a short distance from a flow deflector, the shape of which determines flow magnitude and direction. Third, swirl motion occurs within channels but becomes attenuated farther along the flow. Experiments show, however, that this flow pattern is sustained downstream from the spacer grid, farther than either turbulence or cross flow.

On the other hand, adopting the flow-mixing device in the space grid inevitably brings an increase of pressure drop. It yields a higher hydraulic load on the fuel assembly. In addition, excessive or sudden blocking by the mixing device may cause violent and unsteady eddies and in turn fuel rod vibration. In such a case, a continuous contact slip between fuel rods and the spacer grid may generate wear problems. Therefore, a desirable flow-mixing device should effectively produce the above three kinds of flow patterns, while reducing flow resistance and the likelihood of rod vibration.

A variety of flow-mixing devices for the nuclear fuel spacer grids have been proposed. Typical examples include U.S. Pat. No. 4,692,302 (inventors: Edmund E. Demario, et al., assignee: Westinghouse Electric Corp.), U.S. Pat. No. 5,299,245 (Inventors: Michael E. Aldrich, et al., assignee: B&W Fuel Company), and U.S. Pat. No. 6,236,702 B1 (inventors: Taehyun Chun, et al., assignee: Korea Atomic Energy Research Institute).

In U.S. Pat. No. '302 two mixing vanes are formed at the top of each intersection of the inner straps and are bent in opposite directions. This device generates a strong two directional lateral flow at the rod gaps, but a relatively weak swirl flow in the channel.

In U.S. Pat. No. '245, four mixing vanes are formed on the top of two intersected inner straps at each intersection. The flow-mixing vanes deflect the axial flow into four directional lateral flows. This device generates weak lateral flow at the rod gap, due to collision with the lateral flow from neighboring channels, and a moderate swirl flow in the channel.

In U.S. Pat. No. '702, four mixing vanes are formed at both sides of a triangular extrusion extending from the top of each intersection of the inner straps. These swirl vanes twist the main axial flow to rotate within a channel. Thus, a strong swirl flow is generated in the channel, but a weak lateral flow is generated at the rod gaps.

Enormous effort has been devoted to the flow-mixing devices of the spacer grid. Though there have been achievements, such as those of the flow-mixing devices mentioned above, there is still a strong need for further improvement in the thermal performance of nuclear fuel in order to attain a sufficient operating margin to guard against dryout.

SUMMARY OF THE INVENTION

Accordingly, the present invention has been contrived to overcome the deficiencies in the conventional art.

The spacer grid of the present invention is made up of an intersection of a plurality of thin inner straps, to form a plurality of cells for receiving and supporting fuel rods, and is provided with a coolant flow-mixing device at its top. Each of the inner straps comprises a plurality of primary strap units, each integrated with a primary vane set for forced cross flows in channels at its top edge, and a plurality of secondary strap units, each integrated with a secondary vane set for swirl flows within channels at its top edge. The primary and secondary strap units are alternately arranged along each inner strap. The inner straps intersect with each other at the center of the strap units, such that each intersection is formed by a primary strap unit of an inner strap and a secondary strap unit of another inner strap and has one primary vane set and one secondary vane set at its top as a hybrid flow-mixing device.

The primary vane set is protruded upwardly from the strap, which consists of a trapezoidal shape base of a primary vane stand and two bent primary mixing vanes on both sides, primarily to generate cross flow between channels. The secondary vane set is protruded upwardly from the strap, which consists of a trapezoidal shape base of secondary vane stand and two bent secondary mixing vanes on both sides, primarily for swirl flow generation within the channels. The two kinds of vane sets are alternatively arranged along each strap. The hybrid flow-mixing device induces a complex but effective flow pattern in fuel rod cooling, such as cross flow, swirl flow, and turbulent flow, downstream from the spacer grid

BRIEF DESCRIPTION OF THE DRAWINGS

The above and other objectives, features, and advantages of the present invention will be more clearly understood from the following detailed description taken in conjunction with the accompanying drawings, in which:

FIG. 1 is a perspective view of a contemporary nuclear fuel assembly;

FIG. 2 is a perspective view of a hybrid flow-mixing device on the intersected strap units for the spacer grid in accordance with a first embodiment of the present invention, showing the construction of a primary vane set;

FIG. 3 is a perspective view of a hybrid flow-mixing device on the intersected strap units for the spacer grid, showing the construction of a secondary vane set;

FIG. 4 is a plan view of the intersected straps, showing the construction of the hybrid flow-mixing device of the present invention;

FIG. 5 is a front view of the strap, showing the primary strap unit with the primary vane set and the secondary strap unit with the secondary vane set;

FIG. 6 is a plan view of a spacer grid having the hybrid flow-mixing devices of the present invention, with a plurality of fuel rods installed in the cells of the spacer grid;

FIG. 7 is a front view of the primary vane set, each double-deflected vane in accordance with second embodiment of the present invention; and FIG. 8 is a front view of the primary vane set provided with an extension of the vane stand in accordance with a third embodiment of the present invention.

DETAILED DESCRIPTION OF THE PREFERRED EMBODIMENTS

This invention is related to the flow-mixing device on the top of intersected strap junctions in the spacer grid for the nuclear fuel assembly as shown in FIG. 1. FIGS. 2, 3, and 4 show a hybrid flow-mixing device on a strap junction in different directions. As depicted in FIG. 5, each strap is composed of two types of strap units, called a primary strap unit and a secondary strap unit, and alternately arranged along the strap. The primary strap unit 210 is a strap section having a primary vane set 110 and a secondary strap unit 220 is a strap section having a secondary vane set 120. As shown in FIG. 6, the straps intersect at right angles, and the primary and secondary strap units 210 and 220 form the intersections. A hybrid flow-mixing device 100 is formed around the top of each intersection.

The object of the primary vane set 110 is mainly to take place the forced cross flows of coolant from its channel to neighboring channels in the fuel bundle. As shown in FIG. 5, this primary vane set 110 comprises a primary vane stand 111, which has an isosceles trapezoidal shape (non-parallel sides 111a having top edge 111b extending therebetween) and integrally extends from the top edge of each primary strap unit 210. Two primary mixing vanes 112 integrally extend from opposite upper sides 111a of the primary vane stand 111. In such a case, the two vanes 112 are bent from the vane stand 111 in opposite directions at the same angle. The lower edge of each primary vane 112 is equal in length to each upper side 111a of the primary vane stand 111. The primary vane 112 tapers in width from the lower portion to the upper portion. The primary vane stand 111 is designed such that an acute angle $\alpha$, formed between each upper side 111a of the stand ill and a horizontal line parallel to the top edge of the inner strap, is not more than 45°. Due to the shape of the primary vane stand 111, the lateral vector of the defected coolant by the vane 112 induces the flow to move toward the gap region between fuel rods 300 and finally to enter the neighboring channel.

In order to create strong cross flows of coolant, it is necessary to maximize the width of primary vane 112, which can be accomplished by making the length of the lower side of the vane stand 111 almost equal to the width of the primary strap unit 210. In addition, the lower portion of each primary mixing vane can be extruded upwardly tapering in width toward an upper portion basically, preferably, keeping its width constant with that of vane stand side, to some extend, to take more coolant deflected. On the other hand, the top edge of the trapezoidal stand 111, provided between the two primary vanes 112, forms an opening which provides an outlet of vapor bubbles when the vapor bubbles flowing in the channel collide with the mixing vane and are guided to the central axis of the channel by the deflected surface of the primary vanes 112. The top edge of the trapezoidal stand 111 may be also used to form a welding tap. This tap is fused during an intersection welding process.

The object of the secondary vane set 120 is chiefly to generate swirl flows within channels of the fuel bundle. As shown in FIG. 5, the secondary vane set 120 comprises a secondary vane stand 121, which has a smaller isosceles trapezoidal shape and integrally extends from the top edge of each secondary strap unit 220. Two secondary mixing vanes 122 integrally extend from opposite upper sides 121a of the secondary vane stand 121. In such a case, the two secondary mixing vanes 122 are bent from the vane stand 121 in opposite directions at the same angle, which is not necessarily equal to the angle of primary mixing vane. The lower edge of each vane 122 is equal in length to each upper side 121a of the secondary vane stand 121. Each secondary vane 122 tapers in width from the lower portion to the upper portion. The secondary vane stand 121 is designed such that the acute angle $\beta$, formed between each upper side 121a of the stand 121 and the horizontal line parallel to the top edge of the inner strap, is greater than 45°. Due to the shape of the secondary vane stand 121, the lateral direction of the deflected coolant by the secondary vanes 122 causes the flow to rotate within channels while the coolant going upwardly. The lower portion of secondary mixing vanes extruded also upwardly tapering in width basically from a lower portion to an upper portion, preferably, keeping its width constant with that of the secondary vane stand side, to some extend, to take more coolant deflected.

As shown in FIG. 6, the length of the lower side of the secondary vane stand 121 is not larger than the diameter of an inscribed circle 400 of the four fuel rods 300 forming a channel. If the length of the lower side of the stand 121 is larger than the diameter of the inscribed circle 400, the produced swirl flow of coolant may collide with the fuel rods 300, to attenuate the flow's strength.

When the bubbles collide with the deflected surface of the secondary vanes 122, the top edge of the secondary trapezoidal stand 121, provided between the vanes, forms an opening which allows the flowing vapor bubbles to escape easily, to be guided along the central axis of the channel by the vanes. The top edge of the trapezoidal stand 121 may be also used for a welding tap to tie the intersected straps firmly.

FIG. 6 is a plan view of the spacer grid having the hybrid flow-mixing device of the present invention, with a plurality of fuel rods installed in the cells of the spacer grid. As shown in the drawing, a plurality of inner straps, each having alternately arranged primary and secondary strap units, intersect at right angles to form a desired spacer grid with a plurality of intersections. A primary strap unit and a secondary strap unit form each intersection, and a primary vane set 110 and a secondary vane set 120 are provided at the top of each intersection. In the spacer grid, overall vane patterns are arranged such that the swirl directions are similar to that of rotating gears in a gear train and the cross flow directions are free from collision with those from neighbor channels as indicated by arrows in FIG. 6.

In order to generate the forced cross flow of coolant more directly toward neighboring channels, it is preferred to double-deflect each primary vane 110 at its bottom and middle, as shown in FIG. 7.

On the other hand, the acute angle α of the trapezoidal vane stand 111 can be reduced, as shown in FIG. 8, to cause the cross flow to turn more directly toward the fuel rods gap. In this case, the primary vane set 110 further comprises an extension 115 integrally formed between the trapezoidal vane support 111 and the top edge of the first unit strap 210, thereby the primary vane set 110 have a desired height, preferably equal to the height of the intersected secondary vane stand 121.

As described above, the present invention provides a spacer grid with a hybrid flow-mixing device for nuclear fuel assemblies. The spacer grid effectively mixes the coolants flowing in the channels defined by the fuel rods. The flow-mixing device generates a strong cross flow, a strong swirl flow, and, as a matter of course the violent turbulent eddies. It results in not only breaking the thermal boundary layers formed around the external surfaces of the fuel rods and reducing the thermal imbalance between the channels, but also centering the vapor bubbles in the channel by centrifugal force. Therefore, it can greatly improve the heat removal from the fuel rods.

In the preferred embodiments, the flow-mixing device according to the present invention is designed for use in a spacer grid for nuclear fuel assemblies. It should be understood, however, that the flow-mixing device may also be used in a pipe support structure for boilers or heat exchangers to improve the heat transfer effect of the structure.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A spacer grid for nuclear fuel assembly, fabricated by an intersection of a plurality of thin inner straps, to form a plurality of cells for receiving and supporting fuel rods, and provided with a coolant flow-mixing device at its top:

wherein each of said inner straps comprises a plurality of primary strap units and a plurality of secondary strap units being alternately arranged along each inner strap, and said inner straps are intersected with each other such that each intersection is formed by a primary strap unit of an inner strap and a secondary strap unit of another inner strap;

the primary strap unit comprises a primary vane stand having an isosceles trapezoidal shape, the isosceles trapezoidal shape comprises non-parallel sides and a top edge extending therebetween, two primary mixing vanes extending from the non-parallel sides for creating cross flows of coolant to neighboring cells, wherein the top edge extends between the two primary mixing vanes and defines therewith a bubble outlet; and the secondary strap unit comprises a secondary vane stand having an isosceles trapezoidal shape, the isosceles trapezoidal shape comprises non-parallel sides and a top edge extending therebetween, two secondary mixing vanes extending from the non-parallel sides for creating swirl flows of coolant within the cells, wherein the top edge extends between the two secondary mixing vanes and defines therewith a bubble outlet.

2. The spacer grid according to claim 1, wherein said two primary mixing vanes each have a lower edge equal in length to each upper side of the primary vane stand and extend upward while tapering in width toward an upper portion basically, said two primary mixing vanes being bent from the primary vane stand in opposite directions.

3. The spacer grid according to claim 1, wherein an angle formed between each upper side of the primary vane stand and a horizontal line parallel to the top edge of the primary strap unit is an acute angle of not more than 45°.

4. The spacer grid according to claim 1, wherein said primary vane stand has a lower side of a length almost equal to a width of the primary unit strap.

5. The spacer grid according to claim 1, wherein said primary strap unit further comprises an extension integrally formed between said trapezoidal primary vane stand and the top edge of the primary strap unit.

6. The spacer grid according to claim 2, wherein each of said two primary mixing vanes is additionally bent at a predetermined position.

7. The spacer grid according to claim 1, wherein said two secondary mixing vanes each have a lower edge equal in length to each upper side of the second vane stand and extend upward while tapering in width basically from a lower portion to an upper portion, said two secondary mixing vanes being bent from the secondary vane stand in opposite directions.

8. The spacer grid according to claim 1, wherein an angle formed between each upper side of the secondary vane stand and a horizontal line parallel to the top edge of the secondary strap unit is an acute angle of not smaller than 45°.

9. The spacer grid according to claim 1, wherein a lower side of the secondary vane stand has a length of not larger than the diameter of an inscribed circle of four fuel rods forming a coolant channel.

* * * * *